United States Patent [19]
Roes et al.

[11] 4,185,730
[45] Jan. 29, 1980

[54] MAGNETICALLY ENCODED TOKEN AND HANDLING APPARATUS

[75] Inventors: John B. Roes; Royal C. Moore, both of San Diego, Calif.

[73] Assignee: Cubic Western Data, San Diego, Calif.

[21] Appl. No.: 894,192

[22] Filed: Apr. 6, 1978

[51] Int. Cl.² .............................................. G07F 3/02
[52] U.S. Cl. ................................ 194/4 R; 194/97 A; 235/449; 235/493; 360/97
[58] Field of Search .............. 194/4 R, 4 B, 4 C, 4 D, 194/4 E, 4 F, 4 G, 97 R, 97 A, 5; 235/449, 450, 493; 360/97

[56] References Cited
U.S. PATENT DOCUMENTS

| 3,562,727 | 2/1971 | Abbott et al. ............... 235/449 X |
| 3,575,271 | 4/1971 | Constable et al. ............... 194/4 R |
| 3,578,124 | 5/1971 | Flum ............................... 194/4 R |
| 3,998,309 | 12/1976 | Mandas et al. ................ 194/97 R |

Primary Examiner—Joseph J. Rolla
Attorney, Agent, or Firm—Brown & Martin

[57] ABSTRACT

Apparatus for use in vending machines and the like using a magnetically encoded token as the value medium. The token is a flat disc with a central aperture and a magnetic track around the periphery for carrying coded data, such as the token value. The apparatus accepts a token inserted in an entry slot and temporarily holds a valid token in spaced supports, which allows undersize tokens to drop through. A valid token is advanced over a read and write head and is rotated for scanning of the magnetic track and updating of the data relative to the current transaction. The token is then released into a collection box or, if there is any remaining value, the token is returned to the customer. Only tokens of the correct size, with the proper aperture and a magnetically encoded periphery will be processed. Undersize and otherwise counterfeit tokens are passed through and oversize tokens will not fit into the entry slot.

9 Claims, 15 Drawing Figures

MAGNETICALLY ENCODED TOKEN AND HANDLING APPARATUS

BACKGROUND OF THE INVENTION

The token is primarily intended to serve as a ticket in a transportation system, but could be used in other vending type applications.

In the transportation field, some paper tickets are still used and are often manually dispensed, checked and marked or cancelled. Many tickets are dispensed by machines in return for coins or paper money and are marked or retained after use. Paper tickets are normally used once and result in a large amount of waste.

Recent systems use plastic tickets which can be used up to a hundred times if handled properly. However, collection and sorting is tedious and damaged tickets are usually removed by hand at considerable cost in time and labor.

Some transportation systems use tokens, which have several advantages over plastic and paper tickets. Tokens can be dispensed, handled, collected and sorted by conventional coin handling machines. Metal tokens are very durable and can be used in excess of a thousand times, which greatly reduces the cost of the transaction medium. The primary disadvantage of the tokens in use is their fixed value, which requires the use of one or more tokens for each transaction and necessitates the carrying of numerous tokens for frequent users.

SUMMARY OF THE INVENTION

The system described herein combines the advantages of tokens with their durability and ease of handling, and the multiple use feature of tickets which have sufficient value for several transactions and are undated at each use to show the remaining value.

The token used is a flat disc of a specific size, having a central aperture and a magnetic track around the periphery. The aperture facilitates identification of a token by optical means, such as a photoelectric sensor, which detects the proper interruptions of the light as a token passes by. While size of the token can vary, it has been found that a diameter of about 0.8 inch is particularly suitable. This is slightly smaller than a quarter, so that the token entry slot can be made too small to accept a quarter. The periphery on a token of this size can hold about 50 bits of data on a magnetic track, sufficient for an identifying code or date point of use and the remaining value of the token.

The apparatus accepts a token through an entry slot into a receiver block, in which the token is held on spaced supports. Photoelectric sensor means at the entry slot detects the passage of a valid token and starts the mechanism. Undersize tokens will drop through the supports, while a token of the correct size but without an aperture will be released without further action. All counterfeit tokens which can be inserted in the machine are thus passed through and retained in a collection box.

A valid token resting on the supports is clamped between two face plates which are moved over a read and write head and are rotated, so that the periphery of the token is scanned by the head. An associated validating and control system, such as a computer in the vending machine, reads the value of the token and either updates the magnetic track or initiates disposal of the token. The token is then moved clear of the head and either dropped into the collection box or returned to the customer through the entry slot. Typically, a token would be scanned at the point of entry into a transportation system and encoded with the point of use date. When leaving the system, the token would again be scanned and the value updated according to the amount of the fare from the point of entry.

The mechanism is completely contained in a compact housing which is easily installed in a variety of vending machines. A single motor rotates the face plates and all other actions ae performed by solenoids and cam mechanisms, actuated sequentially according to the condition of the token. A timer keeps the motor running for a predetermined period after each operation, so that the apparatus can be operated continuously during a busy period without having to restart for each token.

The primary object of this invention, therefore, is to provide a new and improved magnetically encoded token and handling apparatus.

Another object of this invention is to provide apparatus which will validate and update a magnetically encoded token and either return or retain the token.

Another object of this invention is to provide apparatus which will positively identify and process a valid token, while passing through and retaining counterfeits.

A further object of this invention is to provide token handling apparatus which can be incorporated into a variety of vending machines.

Other objects and advantages will be apparent in the following detailed description, taken in conjunction with the accompanying drawings, in which:

DESCRIPTION OF THE PREFERRED EMBODIMENT

The token handling mechanism is completely contained in a generally rectangular block or housing 10, which is split into a front housing 12 and a rear housing 14 to facilitate assembly. Any suitable arrangement of screws and alignment pins, not shown, may be used to join the sections and other portions.

Figure 1:
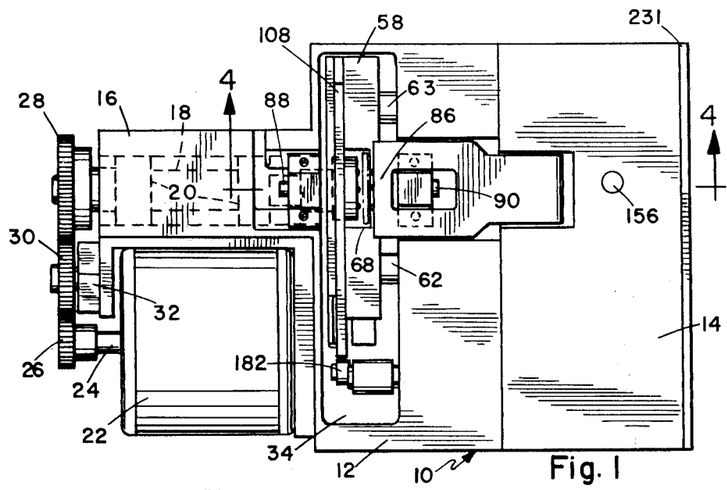
FIG. 1 is a top plan view of the token handling apparatus.

Front housing 12 has a forward extension 16 in which a drive shaft 18 is journalled in bearings 20. Mounted on the front housing 12 at the side of extension 16 is a motor 22, having a shaft 24 with a drive gear 26. Drive shaft 18 carries a gear 28 which is coupled to a gear 26 by an intermediate idler gear 30, the idler gear being mounted on a diagonally adjustable bracket 32 to obtain proper meshing of the gear train.

Figure 4:
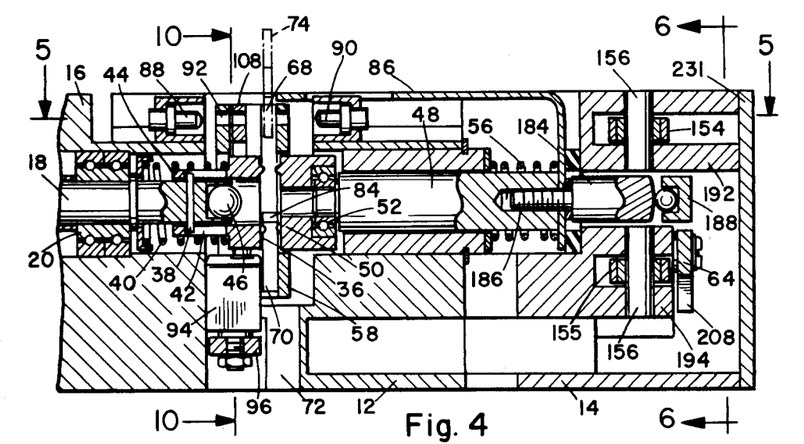
FIG. 4 is an enlarged sectional view taken on line 4—4 of FIG. 1.

Front housing 12 has a cavity 34 extending substantially the full width thereof in the forward portion. Drive shaft 18 protrudes into the cavity 34 and mounted on the rear end of the drive shaft is a face plate 36, which is axially slidable on the drive shaft but keyed to rotate therewith by the drive pin 38. The face plate 36 is biased rearwardly by a load spring 40, the rearward movement being limited by the drive pin 38 in slots 42 in a cylindrical hub portion 44 of the drive plate. Recessed in the rear end of the drive shaft 18 is a centering ball 46, which protrudes from the shaft.

In the housing 10 is an axially slidable shaft 48 coaxial with drive shaft 18. On the forward end of shaft 48 is a face plate 50, freely rotatable on a bearing 52. The confronting faces of face plates 36 and 50 have small raised buttons 54 to grip a token therebetween, as hereinafter described. Shaft 48 is biased rearwardly by a spring 56, so that the face plates are normally separated.

In a cavity 34 is a generally rectangular receiver block 58 having an opening 60 through which the face plates 36 and 50 pass. The receiver block 58 is mounted on a pair of support rods 62 and 63, which are longitudinally slidable in housing 10 parallel to shaft 48. Support rods 62 and 63 are coupled at their rear ends by a connecting bar 64 and are biased forwardly by springs 66.

In the top of receiver block 58 is a receiving slot 68 extending downwardly to an exit slot 70, which is positioned over an exit opening 72 in the lower portion of front housing 12. In the forward biased position of the receiver block, the receiving slot 68 is aligned with the space between face plates 36 and 50.

Figures 2, 3:
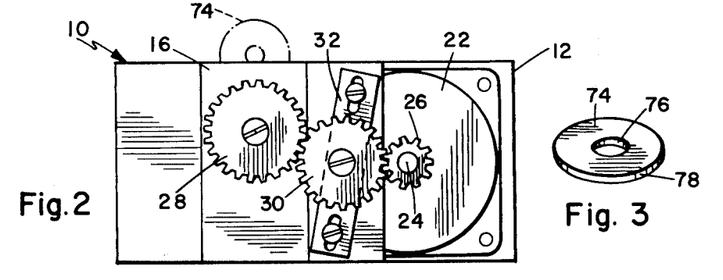
FIG. 2 is an end elevation view as taken from the left hand end of FIG. 1.
FIG. 3 is a perspective view of a token.
Figure 11:
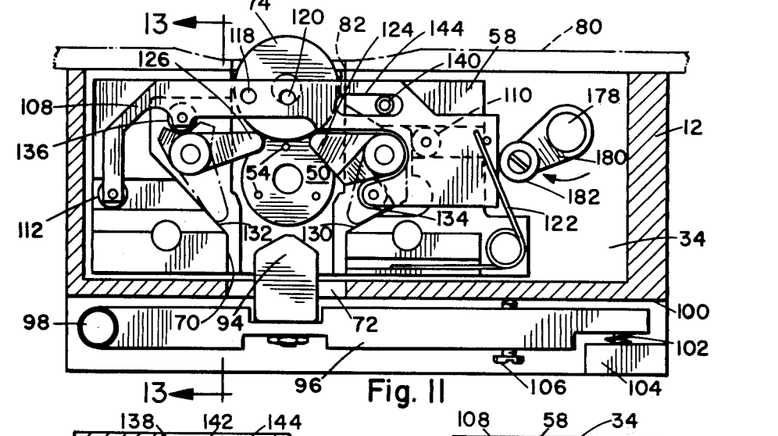
FIG. 11 is a sectional view similar to FIG. 10, showing the token in returned position.
Figure 12:
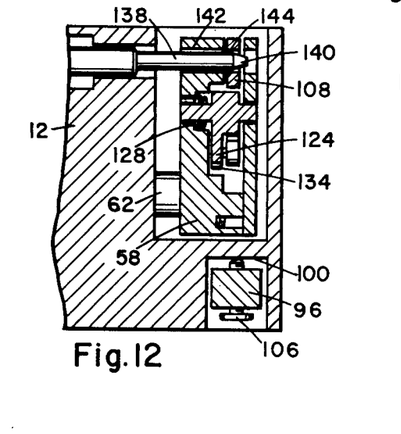
FIG. 12 is a sectional view taken on line 12—12 of FIG. 10.

The token 74, illustrated in FIG. 3, is a flat disc with a central aperture 76. The periphery 78 of the token carries a magnetic recording track on which pertinent data is recorded. Token 74 is preferably slightly smaller than a quarter, so that receiving slot 68 can be made too small to admit a quarter. To avoid the necessity for extremely small clearances, the vending machine in which the apparatus is mounted has a restrictive entry slot 80 in its wall 82, as indicated in broken line in FIG. 11. Alternatively the entry slot 82 could be in a panel attached to housing 10, to ensure that the tokens are guided accurately into the apparatus.

Receiving slot 68 has a pair of stop shoulders 84 which reduce the width of the slot and hold the token 74 with its aperture axially aligned with the drive shaft 18. In this position the token is centered between but not held by the confronting face plates. When the face plates are clamped together, as hereinafter described, a shutter 86 attached to shaft 48 moves forward to cover entry slot 82 and prevent insertion of further objects until the token is processed.

Insertion of a token is sensed by a photodetector 88 positioned rearwardly of cavity 34 above the shaft 48. A light source 90 positioned forward for cavity 34 projects light to the photodetector 88 through a hole 92 in receiver block 58. A photodiode and a light emitting diode are particularly suitable as the sensor elements. A token passing into the receiver block will register as a beam interruption, a momentary beam restoration, a second interruption, then restoration of the beam. Only a token with an aperture will provide the appropriate signal.

In the forward portion of exit opening 72 is a read/write head 94 mounted on an arm 96, which is pivotally arrached at one end 98 to the front housing 12. Arm 96 extends in a channel 100 across the underside of the front housing. At the other end the arm is biased upwardly by a spring 102 seated in a fixed block 104. Adjacent the spring biased end is an adjustment screw 106 threaded through arm 96 to bear against the top of channel 100. This provides a fine adjustment of the head 94 relative to the periphery of the token 74 during the scanning operation, to leave a very small gap and avoid actual contact which could wear out the head.

Figure 10:
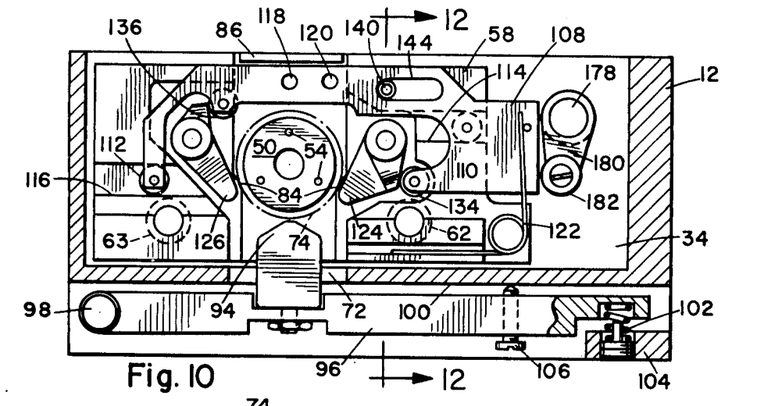
FIG. 10 is a sectional view taken on line 10—10 of FIG. 4.

In the receiver block 58 is a slide plate 108 which slides laterally and is guided by rollers 110 and 112, which roll in parallel tracks 114 and 116 in the receiver block. The slide plate 108 has a pair of holes 118 and 120 which align with the light transmitting hole 92 in two positions of the slide plate. As viewed in FIG. 10, the slide plate is biased to the right by a torsion spring 122.

Figure 13:
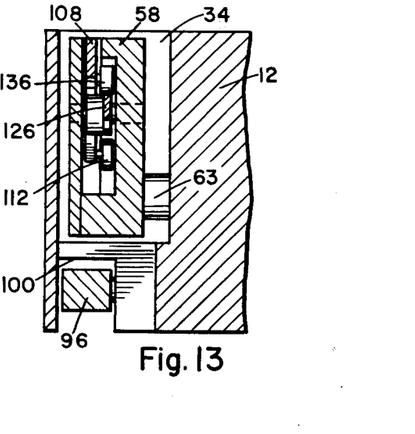
FIG. 13 is a sectional view taken on line 13—13 of FIG. 11.

Mounted on the receiver block 58 immediately rearward of slide plate 108 and in front of the receiving slot 68 are two flippers 124 and 126, pivoted to swing inwardly from opposite sides of the slot. The flippers are biased outwardly by torsion springs, as typified by spring 128 in FIG. 13, and normally rest on stop faces 130 and 132 in the receiver block, as in the broken line positions in FIG. 11. On the slide plate 108 are freely rotatable rollers 134 and 136 positioned to engage flippers 124 and 126, respectively, so that when the slide plate moves to the left, the flippers are rotated inwardly and upwardly.

Figure 5:
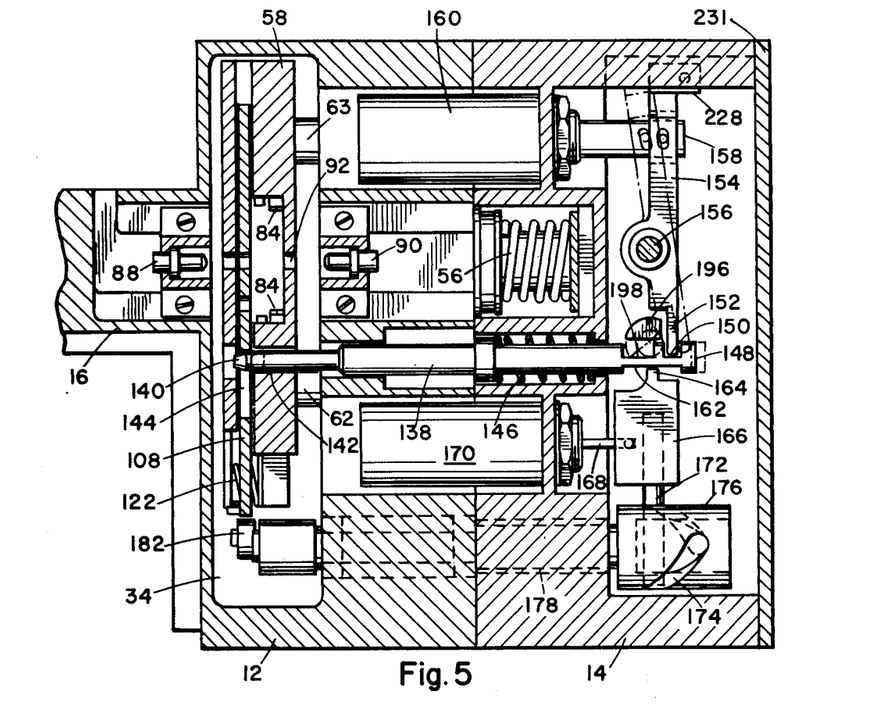
FIG. 5 is a sectional view taken on line 5—5 of FIG. 4.

In the upper portion of the housing is a pin 138 axially slidable parallel to shaft 48. The forward end of pin 138 has a conical tip 140 which passes through a bore 142 in receiver block 58. Slide plate 108 has an elongated slot 144 to receive the pin 138, which is biased forwardly by a spring 146 to enter slot 144, as in the full line position in FIG. 5.

Figure 6:
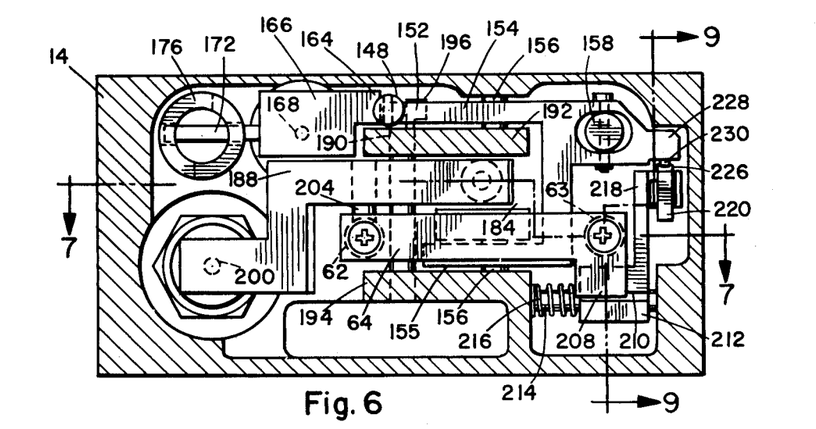
FIG. 6 is a sectional view taken on line 6—6 of FIG. 4.

The rear end portion 148 of pin 138 has a notch 150 which is engaged by a finger 152 at one end of an arm 154, which is pivotally mounted on vertical bearings 156. As seen in FIG. 6, arm 154 is generally U-shaped and has a lower fork 155 which extends behind connecting bar 64. The other end of arm 154 is coupled to the plunger 158 of a solenoid 160 secured in housing 10. Pin 138 has an elongated notch 162 to receive a finger 164 on an actuating block 166, which is moved from front to rear by the plunger 168 of a solenoid 170. A pin 172 projecting from actuating block 166 engages a helical cam slot 174 in a sleeve 176, fixed on the end of an actuating shaft 178. The shaft 178 is journalled in the housing 10 to rotate about an axis parallel to shaft 48. The forward end of shaft 178 extends into cavity 34 and has a radial arm 180 carrying a roller 182, which engages the right hand end of slide plate 108.

Projecting from the rear end of shaft 48 is a button 184, secured to the shaft by a threaded stud 186 which also serves to attach shutter 86 to the shaft. Button 184 is engaged by one end of an arm 188 fixed on a vertical post 190 at the side of support rod 62. Post 190 is rotatably mounted in bearing blocks 192 and 194 and has a latching lobe 196 on the upper end thereof. Pin 138 has a notch 198 to receive latching lobe 196, as in the broken line position in FIG. 5. The other end of arm 188 is coupled to the plunger 200 of a solenoid 202. Arm 188 passes above support rod 62 and projecting downwardly from the arm is a pin 204, which engages a notch 206 in the support rod.

Figure 9:
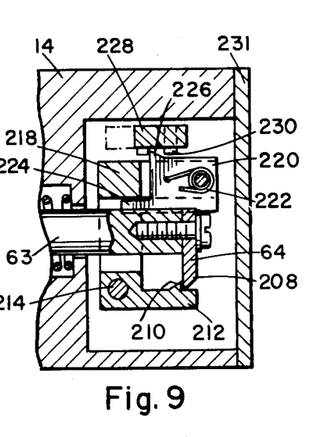
FIG. 9 is a sectional view taken on line 9—9 of FIG. 6.

At the support rod 63, the connecting bar 64 has a downwardly extending latch bar 208, which is engaged by a pawl 210 on a latch lever 212. The latch lever is pivotally mounted on a horizontal shaft 214 below the support rod 63 and is biased by a torsion spring 216 to lift pawl 210 into engagement with the latch bar 208, as in FIG. 9. Latch lever 212 has an arm 218 extending upwardly with a latch plate 220 pivotally mounted on the upper end. The latch plate is biased upwardly by a torsion spring 222 and is held by a stop 224, with a pawl 226 projecting above the arm 218. Arm 154 has an extension 228 with a downwardly projecting latch pin 230 for engagement with pawl 226. The mechanism in the rear portion 14 is enclosed by a back plate 231, secured to the housing in any suitable manner.

OPERATION

Figure 15:
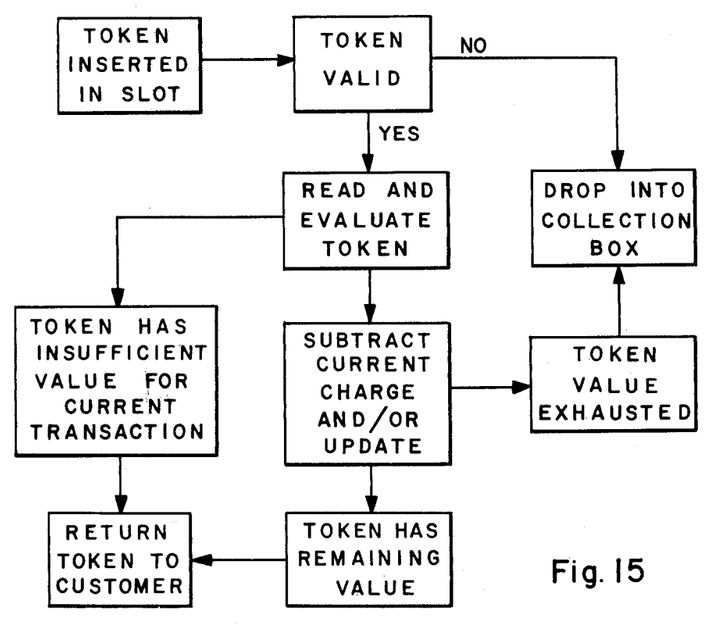
FIG. 15 is a function diagram of the operating sequence of the apparatus.

The various functions of the mechanisms are indicated in FIG. 15. When a token is inserted the validity is initially checked by the photosensors to determine that the token has the required aperture. If the token is not valid, by not having an aperature or being undersize, the mechanism will not be actuated and the counterfeit will drop through the collection box. If the token is valid as to size and aperture it will be moved to the read and write position and the magnetically coded track scanned.

In a typical use a token would be inserted in a machine upon entry into a transportation system and encoded with the point of entry identification. Upon leaving the system the token would be inserted in another machine, which would read the data and compute the appropriate fare. The magnetic track would then be updated with the fare deducted from the current value of the token.

If the token value is exhausted it is dropped into the collection box. Any suitable container, not shown, may be positioned under exit opening 72 to catch the tokens. If the token has insufficient value for the transaction, it is returned to the customer and some indication if given that other payment is required. If the token still has remaining value it is returned to the customer for further use.

Figure 14:
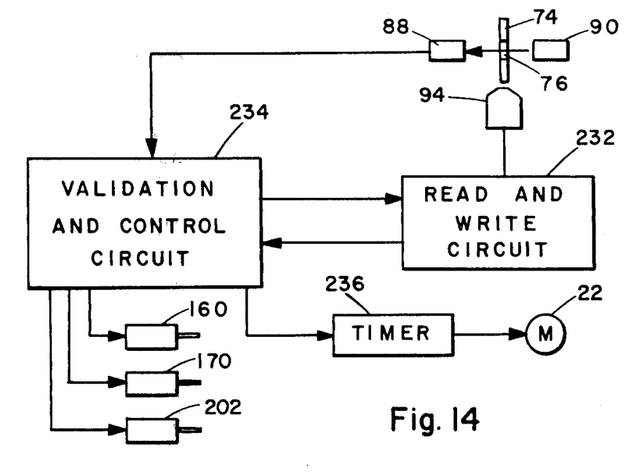
FIG. 14 is a block diagram of the control system.

The operation can be controlled by a simple computer programmed to accept, evaluate and update the magnetically encoded data through a read and write circuit 232, as in FIG. 14. Various computer and microprocessor circuits presently available can provide the necessary validating and control circuit 234, which controls the motor 22 and solenoids 160, 170 and 202.

Figure 7:
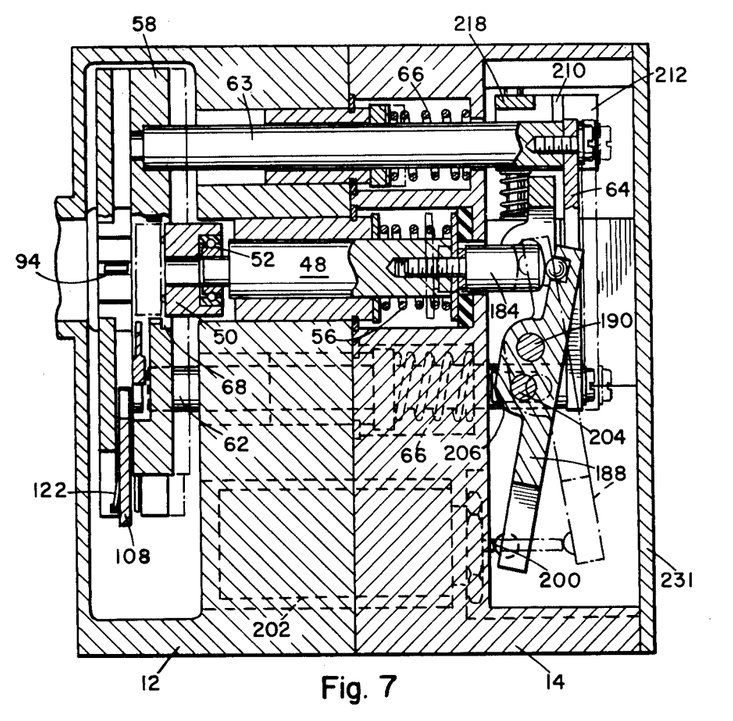
FIG. 7 is a sectional view taken on line 7—7 of FIG. 6.
Figure 8:
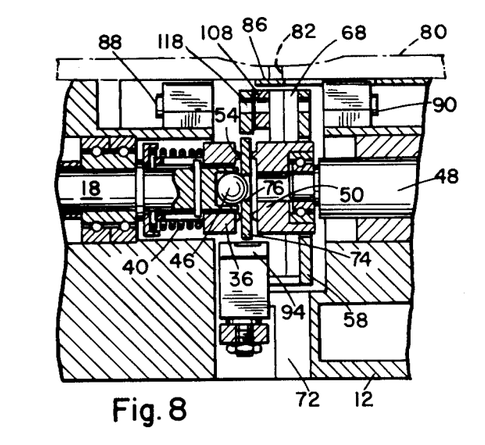
FIG. 8 is a sectional view similar to a portion of FIG. 4, showing the token in the read and write position.

The mechanism operates as follows:

A token 74 inserted through entry slot 82 drops into the receiving slot 68 and comes to rest on shoulders 84. Photodetector 89 signals that a token is in place and control circuit 234 starts motor 22, which rotates shaft 18 and the face plate 36. Solenoid 202 is then energized and moves arm 188 to the broken line position in FIG. 7. This pushes shaft 48 to the left and clamps token 74 between face plates 50 and 36. The motion continues until face plate 36 is pushed back against spring 40 and the aperture 70 of the token is seated on centering ball 46, which centers the token precisely on the rotational axis of shaft 18 as in FIG. 8. In this position the token is rotated over head 94 and the encoded periphery is scanned to determine the disposition of the token.

Simultaneously with shaft 48 being pushed to the left, three other actions occur. Pin 204 engaged in slot 206 pulls support rod 62 to the right which, through connecting bar 64 and support rod 63, moves the receiver block 58 to the right, as in the broken line position in FIG. 7. This causes latch bar 208 to be engaged by pawl 210, as in FIG. 9, latching the receiver block 58 in that position, in which the plane of flippers 124 and 126 is directly below entry slot 82.

At the same time latching lobe 196, which has rotated with post 190 in arm 188, enters notch 198 and locks pin 138 against being moved to the right. With the pin thus locked, motion of the receiver block 58 to the right will cause slide plate 108 to move slightly to the left by camming action of conical tip 140 in slot 144, as in FIGS. 5 and 10. With this slight movement rollers 134 and 136 will move flippers 124 and 126 just enough to hold token 74, which will subsequently be deposited on the flippers.

Also, as a result of shaft 48 moving to the left, shutter 86 will block entry slot 82 and prevent anything from being inserted into the machine while the mechanism is operating.

After the token has been scanned and its disposition determined, solenoid 202 will be de-energized and spring 56 will retract shaft 48 and face plate 50. The face plate 36 following, by the action of spring 40, will push the token onto flippers 124 and 126. Shutter 86 is retracted along with shaft 48, opening the entry slot 82.

If the token is to be returned to the customer, solenoid 170 will be energized, pushing actuating block 166 to the right so that pin 172 in the cam slot 174 rotates shaft 178. This swings arm 180 and roller 182 pushes the slide plate 108 to the left, as in FIG. 11. Rollers 134 and 136 cause flippers 124 and 126 to swing inwardly and upwardly, ejecting token 74 out through entry slot 82 for retrieval by the customer.

Operation of solenoid 170 also causes pin 138 to be pulled to the right by finger 164 in notch 162. This causes arm 154 to be moved due to finger 152 being engaged in notch 150, as in the broken line position in FIG. 5. Latching lobe 196 has retracted from notch 198 with the previous return motion of arm 188, freeing pin 138 for movement. The motion of arm 154 causes the pin 230 in extension 228 to ride forward over pawl 226 and become latched in that position, as indicated in broken line in FIG. 9. Latch bar 208 remains latched on pawl 210.

When the token is removed from the entry slot 82, the photodetector 88 senses its passage and initiates the de-energization of solenoid 202. Torsion spring 122 pulls the slide plate 108 back to the right, which causes arm 180 to swing and rotate shaft 178. This pulls actuating block back through the helical cam coupling and allows spring 146 to pull pin 138 to the left. Movement of pin 138 pulls finger 152 and swings arm 154. Since pin 230 is latched on pawl 226, the latch lever 212 is caused to pivot on shaft 214. Pawl 210 is pulled down, releasing latch bar 208, and springs 66 return the receiver block 58 to its forward position. Pin 230 rides over the top of pawl 226, which is pushed down as the latch lever 212 pivots, and returns to the full line position in FIG. 9, thus resetting the mechanism.

If the token is to be deposited in the collection box, the sequence of events is the same as that described above, up to the depositing of the token on the flippers after scanning the data track. Then solenoid 160 will be energized to swing arm 154, so that fingger 152 pulls pin 138 to the right. This removes the conical tip 140 from slot 144 and allows spring 122 to pull the slide plate 108 slightly to the right. The torsion springs 128 pull the flippers 124 and 126 down against their respective stop faces 130 and 132, allowing the token to fall through the exit opening 72. Solenoid 160 is then de-energized and spring 146 will pull back the pin 138, swinging arm 154 and releasing latch bar 208, as described above. Springs 66 return the receiver block 58 to its forward position and the mechanism is reset.

A timer 236 is installed in the circuit of motor 22 to keep the motor running for a period after the mechanism has cycled. If the apparatus is in constant use, this avoids the necessity for starting up the motor for each token insertion, but allows the machine to shut off when not used.

As mentioned above, a counterfeit token, coin or slug larger than token 74 will not fit through entry slot 82. Those smaller than the width between shoulders 84 will drop through into the collection box.

If a counterfeit of the correct diameter but without an aperture is inserted, it will be caught on shoulders 84. The motor 22 will not be turned on because the photodetector 88 did not provide the proper signal. However, solenoid 160 is energized causing arm 154 to pull pin 138 to the right. Lower fork 155 of arm 154 contacts the connecting bar 64 and pulls the receiver block to the right. The counterfeit, being held against face plate 50, is pushed on to the flippers 124 and 126. However, with pin 138 withdrawn, slide plate 108 is pulled to the right by spring 122 and the flippers drop down, allowing the counterfeit to fall through. When solenoid 160 is de-energized the mechanism resets itself.

A counterfeit token having the correct diameter and aperture, but no peripheral magnetic track, will be handled as a conventional token but will not be validated by the read and write circuit 232. The counterfeit will thus be deposited in the collection box in the manner of an exhausted token.

The apparatus is capable of handling a large number of tokens in rapid succession, the cycle time being about half a second or less. The mechanism is not easily jammed since anything that will fit through the entry slot can be processed in one way or another.

Having described our invention, we now claim:

1. A token handling apparatus for use with a flat disc token having central aperture and a magnetically encodable peripheral track, the token handling apparatus comprising:
    a housing having a front portion and a rear portion; said housing having a token receiver therein, said receiver having a token receiving slot with support means for holding a token therein in an initial position;
    detector means on said housing for sensing the insertion of a token into the receiver;
    a magnetic read and write head adjacent said receiver;
    token holding and rotating means responsive to a token received signal from said detector means for rotating a token over said head to scan the peripheral track;
    said token holding and rotating means including a drive shaft rotatably mounted in said front portion and extending longitudinally from front to rear, the rear end of said shaft having a driven face plate thereon adjacent the initial position of a token in said receiver;
    said driven face plate being axially slidable on said drive shaft and being biased rearwardly thereon, the rear end of said drive shaft having a centering ball therein normally enclosed by the driven face plate;
    a sliding shaft axially slidably mounted in said housing coaxial with said drive shaft, and having a rotatable face plate thereon confronting said driven face plate to hold a token therebetween at the initial position;
    actuating means coupled to said sliding shaft for moving said rotatable face plate against said driven face plate with a token therebetween and retracting the driven face plate forwardly to seat the aperture of the token over said centering ball with the token in a scanning position over said head;
    and token ejecting means in said receiver, responsive to data on the peripheral track for ejecting a token from the receiver in one of two directions.

2. Apparatus according to claim 1, and including a shutter attached to said sliding shaft to cover said receiving slot when the sliding shaft is moved to the token scanning position.

3. Apparatus according to claim 1 and including a motor mounted on said housing with a driving connection to said drive shaft;
    control means responsive to a correct token received signal from said detector means for starting said motor;
    and a timer connected to said motor to maintain the motor in operation after a token has been cycled through the apparatus.

4. Apparatus according to claim 1, wherein said housing has a lower portion with a token exit opening therein below said receiving slot;
    said token ejecting means including token holding members in said receiver, movable between a clear position clear of said receiving slot and an ejection position across the receiving slot to hold a token protruding from the receiving slot.

5. Apparatus according to claim 4, wherein said token holding members are flippers pivotally mounted in said receiver and biased to the clear position, and including cam actuated means for moving said flippers to the ejection position and to an intermediate support position for holding a token above said exit opening.

6. Apparatus according to claim 5, wherein said receiver has supporting rods longitudinally slidable in said housing and being biased to a forward position;
    actuating means coupled between said sliding shaft and said supporting rods to displace said receiver rearwardly as the sliding shaft moves to the token scanning position;
    said flippers being mounted immediately forwardly of said initial position support means and being moved to the plane of the initial position when the receiver is displaced rearwardly to receive a token returned to the initial position after scanning;
    and latching means for releasably latching said receiver in the rearwardly displaced position.

7. Apparatus according to claim 6, wherein said receiver has a slide plate laterally slidable therein and coupled to said flippers;
    said cam actuating means including a first cam engaging said slide plate as the receiver is displaced rearwardly, to move the flippers to the intermediate position, and a second cam for moving the slide plate further to move the flippers to the ejection position.

8. Apparatus according to claim 7, and including means for selectively latching said first cam out of engagement with the slide plate.

9. In combination with a flat disc token having a central aperture and a magnetically encodable peripheral track, token handling apparatus comprising:
- a housing having a token receiver therein, said receiver having a token receiving slot with support means for holding a token therein in an initial position;
- detector means on said housing for sensing the insertion of a token into the receiver;
- a magnetic read and write head adjacent said receiver;
- token holding and rotating means responsive to a token received signal from said detector means for rotating a token over said head to scan the peripheral track;
- said token holding and rotating means including means to pick up and move a token axially from the initial position to a scanning position and return the token to the initial position;
- token ejecting means in said receiver, responsive to data on the peripheral track for ejecting a token from the receiver in one of two directions;
- said means for moving said receiver while the token is in the scanning position to move said ejecting means to the initial position for receiving the returned token.

* * * * *